United States Patent [19]

Domb et al.

[11] Patent Number: 4,757,128

[45] Date of Patent: Jul. 12, 1988

[54] HIGH MOLECULAR WEIGHT POLYANHYDRIDE AND PREPARATION THEREOF

[75] Inventors: Abraham J. Domb, Brookline; Robert S. Langer, Somerville, both of Mass.

[73] Assignee: Massachusetts Institute of Technology, Cambridge, Mass.

[21] Appl. No.: 892,809

[22] Filed: Aug. 1, 1986

[51] Int. Cl.[4] .............................................. C08G 63/00
[52] U.S. Cl. ..................................... 528/271; 424/78; 528/206; 528/207
[58] Field of Search ......................... 528/271, 206, 207

[56] References Cited

U.S. PATENT DOCUMENTS

| | | | |
|---|---|---|---|
| 2,071,250 | 2/1937 | Carothers | 260/106 |
| 2,071,251 | 2/1937 | Carothers | 18/54 |
| 3,526,612 | 9/1970 | Allphin | 260/78.4 |
| 3,960,150 | 6/1976 | Hussain et al. | 128/260 |
| 3,981,303 | 9/1976 | Higuchi et al. | 128/260 |
| 3,993,071 | 11/1976 | Higuchi et al. | 128/260 |

FOREIGN PATENT DOCUMENTS 968715  9/1964  United Kingdom .

OTHER PUBLICATIONS

"Synthesis of Polyanhydrides X. Mixed Anhydrides of Aromatic and Five-membered Heterocyclic Dibasic Acids," by Naoya Yoda in *High Polymer Chem. Japan* 10–35 (1962).

"Polyanhydrides" in Encyclopedia of Polymer Science and Technology, 10, 630–653 (John Wiley & Sons, New York, 1969).

P. D'Amore, M. Marletta, and R. Langer in *J. Biomed. Mtls. Res.* 20, 51–64 (1986).

"Bioerodible Polyanhydrides for Controlled Drug Delivery," by H. B. Rosen, J. Chang, G. E. Wnek, R. J. Linhardt, and R. Langer in *Biomaterials* 4, 131–133 (1983).

"Bioerodible Polyanhydrides as Drug-carrier Matrices. I: Characterization, Degradation, and Release Characteristics," by K. W. Leong, B. C. Brott, and R. Langer in *J. Biomed. Mtls. Res.* 19, 941–955 (1985).

"Bioerodible Polyanhydrides as Drug-carrier Matrices. II: Biocompatibility and Chemical Reactivity," by K. W. Leong, Synthesis of Polyanhydrides. XII., N. Yoda, *J. Polymer Sci.* vol. 1, 1323–1338 (1963).

Synthesis of Polyanhydrides III., N. Yoda, 174–190 (1963).

*Primary Examiner*—Harold D. Anderson
*Attorney, Agent, or Firm*—Kilpatrick & Cody

[57] ABSTRACT

High molecular weight polyanhydrides, defined as polyanhydrides having a molecular weight average greater than 20,000 or an intrinsic viscosity of greater than 0.3 dl/g in an organic solvent at room temperature, are formed by melt polycondensation of highly pure isolated prepolymers under optimized reaction conditions, particularly time and temperature with removal of the condensation product. Higher molecular weights are obtained by inclusion of a catalyst with the prepolymers in the melt polymerization. Catalysts used for transesterification, ring opening polymerization and related polymerizations may be utilized.

The high molecular weight polyanhydrides have improved physico-mechanical properties and are especially well suited for biomedical applications, particularly in controlled release devices for drug delivery.

20 Claims, 8 Drawing Sheets

Glucose in urine

FIGURE 7B

Glucose in blood

FIGURE 8

HIGH MOLECULAR WEIGHT POLYANHYDRIDE AND PREPARATION THEREOF

The Government has rights in this invention pursuant to Grant Number NIH-2-R01-GM26698-07 awarded by the Department of Health and Human Services.

BACKGROUND OF THE INVENTION

This invention is in the area of organic synthesis and is in particular a method for synthesis of high molecular weight polyanhydrides.

Synthesis of aromatic polyanhydrides was first reported in 1909. In the 1930's, Carothers and Hill prepared a series of aliphatic polyanhydrides intended as substitutes for polyesters in textile applications, as reported in *J. Am. Chem. Soc.*, 52, 4110 (1930), and *J. Am. Chem. Soc.*, 54, 1569 (1932). In the late 1950's, A. Conix reported poly[bis(p-carboxyphenoxy)alkane anhydrides] having a much improved hydrolytic resistance as well as excellent film and fiber-forming properties, in *Makromol. Chem.*, 24, 76 (1957), and *J. Polym. Sci.*, 29, 343 (1958). These polymers are insoluble in common organic solvent, however, so they cannot be solvent cast. Subsequent studies examined a number of aromatic and heterocyclic polyanhydrides. Including copolymers, over one hundred polyanhydrides had been prepared by 1965. However, these polyanhydrides were never commercialized, presumably due to the problem of hydrolytic instability.

High molecular weight polyanhydrides are essential for biomedical applications where superior physico-mechanical properties including film forming, high tensile strength, yield of break and impact are required. Although synthesis of polyanhydrides is well documented, polyanhydrides having a molecular weight average in excess of 15,000 to 20,000 and an intrinsic viscosity in organic solvents of greater than 0.3 dl/g are not synthesized using any of the known methods. Previous reports of polyanhydrides having higher molecular weights were based on estimated molecular weights. Controlled studies using instrumentation not available when these reports were made have shown that the polyanhydrides produced by solution polymerization and melt polymerization have a molecular weight average of a few thousand up to at most 20,000. The low molecular weight polyanhydride polymers are limited by their low molecular weight (generally 12,500 mw) and corresponding low intrinsic viscosity in solution (approximately 0.1 to 0.3 dl/g in organic solvents at room temperature). Although polyanhydrides are useful in controlled release drug delivery systems due to their hydrolytic instability and the fact that they degrade into monomeric diacids which are highly biocompatible, as shown by tissue response and toxicological studies, the rate of degradation is too rapid for many applications.

Further, the manufacture of controlled release devices is limited since the devices incorporating the low molecular weight polyanhydrides can only be manufactured in two ways: by mixing the powdered polyanhydride with the bioactive substances and then pressing the mixture into devices or by melting the polyanhydrides and bioactive substances at a relatively high temperature. The first method frequently results in a non-homogeneous mixture or poor release kinetics and the second causes degradation of the incorporated drugs or a reaction between the drugs and the polyanhydrides.

It is desirable to be able to solvent cast the polyanhydrides to form films for the manufacture of biomedical devices. Increasing the aromatic content and/or the molecular weight of these polyanhydrides would impart film forming properties to the polymers. Films have a number of advantages including a more homogeneous distribution of bioactive material, the ability to be cast as a sheet at ambient temperature for cutting up into the desired sizes and shapes and desirable release kinetics for controlled release of bioactive materials.

In recent years, much research has been directed to developing polymeric compositions and delivery systems for the programmed release of biologically active agents, especially drugs, over preselected periods of time. The purpose of these programmed release systems is to dispense the biologically active substance at a controlled and, preferably, constant rate after in vivo implantation into a patient. One application of these systems is an improved therapeutic regimen wherein a pharmaceutically active drug is released in a beneficial and reliable manner with the minimum potential for complications or failure to provide adequate dosage.

Although controlled release of biologically active substances has been accomplished in several ways, the preferred mechanism is to utilize an implanted polymeric matrix which degrades in vivo into soluble degradation products. The distinct advantage of this method is the elimination of the need for surgical removal of the article at a later date. Despite the desirability of such a mechanism, however, the development of polymeric matrix systems using bioerodible polymers for controlled release of active agents has not progressed quickly. In fact, few bioerodible polymers have been developed for biomedical or in vivo use. Of these, a few polymeric formulations were designed specifically for the release of biologically active substances. Examples of useful polycarbonate and polyorthoester polymeric compositions are described in U.S. Pat. No. 4,070,347. Polylatic acid and polylatic/glycolic acid copolymers are commercially available substances used for controlled release at biologically active substances.

For a polymer to be useful as a matrix for controlled release of a biologically active substance, surface erosion of the polymer should be the determining factor for release of the entrapped substance. Further, to be suitable for use in vivo, the polymeric matrix composition must degrade into low molecular weight, non-toxic products. Ideally, the polymeric matrix erodes at a preselected, constant rate and the biologically active substance is released at a zero-order rate, without regard to the concentration of any other chemical component. To obtain a zero-order release reaction of active substances from the matrix, it is necessary to utilize a matrix geometry which does not change substantially in surface area as a function of time.

To be useful as a matrix for controlled release of a biologically active substance, the composition must also not undergo bulk erosion which often occurs in addition to, or in place of, surface erosion, rendering the entire polymer composition sponge-like and causing breakup of the matrix. To erode heterogeneously, the polymer should be hydrophobic yet contain water labile linkages. Bulk erosion is directly due to the hydrophilic nature of most bioerodible polymeric compositions. Hydrophilic bioerodible polymers incorporate water which is drawn into the center of the matrix. Polymers which undergo bulk erosion include polylactic acid, polyglutamic acid, polycaprolactone and lactic-/glycolic acid copolymers.

One hydrophobic composition which is useful for delivery of biologically active substances is polyorthoesters. An advantage to their use is that hydrolysis of orthoester is pH sensitive and pH may therefore be used for regulation of the release of the active substance. However, all polyorthoesters synthesized to date are often too hydrolytically stable for use in controlled release systems without acid catalysts included within the matrix to promote bioerosion. As a consequence, the polyorthoester polymers-additive system swell substantially when attempts are made to suppress degradation in the interior of the matrix, the rate of swelling often dominating and affecting the rate of release for the active substance more than the rate of erosion itself.

As described in co-pending patent application Ser. No. 820,290, filed Jan. 21, 1986, entitled "Bioerodible polyanhydrides for Controlled Drug Delivery" by Robert S. Langer, Howard Rosen, Robert J. Lonhardt and Kam Leong, other compositions which are useful as hydrophobic polymeric matrices for the controlled release of biologically active substances after implantation are polyanhydride polymers prepared by a modification of the melt polycondensation synthesis method of Conix, described in *Macro Synth.* 2, 95–98 (1966), in which the prepolymer is recrystallized initially to provide a more pure, higher molecular weight unit for polymerization. Selected polyanhydrides completely degrade to their monomers under physiological conditions at rates useful for drug delivery. Degradation rates are high in polymers or copolymers of sebacic acid. Erosion rates are highly dependent on the number of methylene groups. As with the other reported polyanhydrides, these polymers also have low molecular weight (up to 15,000) and intrinsic viscosities (up to 0.3 dl/g). As a result, their physico-mechanical properties and release kinetics are less than is desired.

It is therefore an object of the invention to provide a method for synthesizing high molecular weight polyanhydride polymers.

It is another object of the invention to provide less hydrophobic high molecular weight polyanhydride polymers for use in biomedical applications, especially controlled release of biologically active substances in vivo.

SUMMARY OF THE INVENTION

The present invention is a method for synthesizing high molecular weight polyanhydrides wherein a high molecular weight polyanhydride is defined as having a molecular weight average in excess of 20,000 and is characterized by an intrinsic viscosity of greater than 0.3 dl/g in organic solvent at room temperature.

High molecular weight polyanhydrides are synthesized from highly pure isolated prepolymers formed from:
aliphatic dicarboxylic acids, as defined by the formula: HOOC—H₂C—R—CH₂—COOH;
aromatic dicarboxylic acids, as defined by the formulas:

-continued aromatic-aliphatic dicarboxylic acid, as defined by the formula:

combinations of aromatic, aliphatic and aromatic-aliphatic dicarboxylic acids;
aromatic and aliphatic heterocyclic dicarboxylic acids defined by the formula:

wherein
X=O, N or S
n=1 to 3;
and aromatic and aliphatic heterocyclic dicarboxylic acids in combination with aliphatic dicarboxylic acids, aromatic dicarboxylic acids of more than one phenyl group. The formulas are to be construed to include substitutions on the aromatic groups of the dicarboxylic acid. The R group is a divalent organic radical group, In the preferred method, the high molecular weight polyanhydrides are synthesized by melt polycondensation of highly pure dicarboxylic acid monomers converted to the mixed anhydride by reflux in acetic anhydride for 15 to 30 minutes; isolation and purification of the isolated prepolymers by recrystallization; and melt polymerization under low pressure (10⁻⁴ mm) with a dry ice/acetone trap at a temperature between 140° C. and 250° C., more preferably 180° C., for between 10 and 300 minutes, more preferably 90 minutes. Higher molecular weights are obtained by inclusion of a catalyst which increases the rate of anhydride interchain exchange. Catalysts which are useful include any catalysts active in transesterification, ring opening polymerization and related polymerizations. The preferred catalysts are heterogenic coordination catalysts, such as Cd(CH₃COO)₂, alkaline earth metal oxides such as CaO, BaO and CaCO₃, and complexes of ZnEt₂ and hydroxylated molecules.

In the examples, higher molecular weight polyanhydrides are produced from monomers such as sebacic acid (SA), bis(p-carboxy-phenoxy)propane (CPP), isophthalic acid (Iph), and dodecanedioic acid (DD). Examples are also included of controlled release in vivo and in vitro from devices formed of high molecular weight polymers.

DETAILED DESCRIPTION OF THE INVENTION

The present invention is a method for synthesizing high molecular weight polyanhydrides wherein high molecular weights polyanhydrides (HMW PA) are defined as polyanhydrides having a molecular weight in excess of 20,000 or as having a high intrinsic viscosity in excess of 0.3 dl/g in organic solvents at room temperature. The HMW PA are particularly useful in biomedical applications, such as in controlled release drug delivery systems.

The method for synthesizing the HMW PA consists of:

selecting highly pure prepolymers consisting of mixed anhydrides prepared from highly pure dicarboxylic acids wherein the anhydrides are formed by refluxing the diacids in acetic anhydride, propionic anhydride, or other short aliphatic anhydrides or by reacting the diacids with acetyl chloride or other short aliphatic acid chlorides in the presence of an organic base such as triethylamine;

polymerizing the highly pure prepolymers at a temperature and for a time such that a high molecular weight polyanhydride is formed, generally in the range of 140° C. to 250° C., for a period of 10 to 300 minutes for the preferred monomers;

removing the condensation product formed by the polymerization, preferably by means of a chilled trap under vacuum; and stopping the reaction at the point before the HMW PA begin to degrade or forming an insoluble gel.

The time and temperature of the polymerization act in cooperation to yield a HMW compound. The polymer composition is also important. In the following examples, polymerizing the prepolymers for between 60 and 120 minutes, most preferrably 90 minutes, at a temperature of between 150° C. and 220° C., most preferrably 180° C., was found to yield the highest molecular weights for polymers composed of sebacic acid, bis(p-carboxyphenoxy)propane, isophthalic acid and dodecanedioic acid.

Polymers may be synthesized from highly pure isolated prepolymers formed from:

aliphatic dicarboxylic acids, as defined by the formula: $HOOC-H_2C-R-CH_2-COOH$;

aromatic dicarboxylic acids, as defined by the formulas:

aromatic-aliphatic dicarboxylic acid, as defined by the formula:

combinations of aromatic, aliphatic and aromatic-aliphatic dicarboxylic acids;

aromatic and aliphatic heterocyclic dicarboxylic acids defined by the formula:

wherein
X=O, N, or S
n=1 to 3;

and aromatic and aliphatic heterocyclic dicarboxylic acids in combination with aliphatic dicarboxylic acids, aromatic-aliphatic dicarboxylic acids, and aromatic dicarboxylic acids of more than one phenyl group. The formulas are to be construed to include substitutions on the aromatic groups of the dicarboxylic acid. The R group is a divalent organic radical group.

In addition to the monomers used to form the copolymers in the examples, the following monomers are preferred for use in synthesizing copolymers for biomedical applications:

bis(p-carboxyphenoxy)alkanes; Hydroquinone-0,0' diacetic acid; 1,4-bis-carboxymethyl benzene; 2,2-bis(4-hydroxphenyl)propane-0,0'-diacetic acid; 2,2-bis(4-carboxyphenyl)propane; terephthalic acid; bis(4-carboxyphenyl)alkanes; 1,4phenylene dipropionic acid; and cyclohexane dicarboxylic acids.

The molecular weight of the polymers can be significantly increased by including a catalyst with the prepolymers in the melt polymerization. Any catalysts used for transesterification, ring opening polymerization and related polymerizations are useful In the disclosed examples, acid, base and coordination catalysts, such as Cd(CH$_3$COO)$_2$, alkaline earth metal oxides including CaO, BaO, and CaCO$_3$, and Zn(C$_2$H$_5$)$_2$—H$_2$O are used. Heterogenic coordination catalysts are preferred since the catalyst can be easily removed from the polymer for biomedical use.

High molecular weight polyanhydrides are synthesized by melt polycondensation with two important modifications: pure isolated prepolymers are used in the polymerization reaction and the reaction conditions are carefully controlled.

In the preferred method, the dicarboxylic acid monomers are converted to the mixed anhydride by total reflux in acetic anhydride. Caution must be taken to avoid excessive reaction.

Polyanhydrides composed of the monomers: sebacic acid (SA), bis(p-carboxyphenoxy)propane (CPP), isophthalic acid (IPh), and dodecanedioic acid (DD) are used in the following examples.

Sebacic acid, dodecanedioic acid, (99% Aldrich Chemical Co., Milwaukee, WI) were recrystallized three times from ethanol. Bis(p-carboxyphenxy)propane was synthesized according to the method of Conix, *Macro Synth.* 2, 95–98 (1966). Isophthalic acid (99%, Aldrich) was recrystallized twice from ethanol. All solvents were analytical grade.

The following catalysts: calcium oxide, calcium carbonate, diethyl zinc (15 wt % solution in toluene), cadmium acetate hydrate (Aldrich), barium oxide (EM Sciences, New Jersey), were reduced to less than 50 micron particle size before use.

The polymers and prepolymers were characterized by infrared spectroscopy, thermal analysis, melting point, viscosity, stress-strain and GPC.

Infrared spectroscopy was performed on a Perkin-Elmer Spectrophotometer Model 1430. Polymeric samples were film cast onto NaCl plates from solutions of the polymer in chloroform. Prepolymer samples were either pressed into KBr pellets or dispersed in nujol onto NaCl plates.

Thermal analysis of polymers was determined on a Perkin-Elmer DSC-2 differential Scanning Calorimeter employing a heating rate of 20°/min. The melting point of prepolymers was determined on a Fisher Johns melting point apparatus. The molecular weight of the polymers and prepolymers were estimated on a Perkin-Elmer GPC system consisting of the series 10 pump, the 3600 Data Station and the LKB 214—rapid spectral detector at 254 nm. Samples were eluted in chloroform through two PL Gel columns (Polymer Laboratories; 100 Angstroms and 1000 Angstroms pore sizes) in series at a flow rate of 1.5 ml/min. Polystyrene (Polyscience PA) was used as the calibration standard. The viscosity of the polymers was measured in an Ubbelohde Viscometer (cannon 75) at 23° C. using 1, 0.5 and 0.25 % w/v polymer in chloroform solution. $^1$H-NMR spectra were run on a Bruker AM-250 spectrometer in CDCl3. The mechanical properties of films composed of CCP:SA copolymers (see below) were determined on an Instron Instrument Model 1122 stress-strain tester at an initial strain rate of 0.05 mm/min following the ASTM designation D882-81 for tensile properties characterization of thin plastic sheeting.

Polymer films of 0.8 mm thickness were prepared by a solvent casting method as follows. Solutions of CPP:SA copolymers (20% w/v) in dichloromethane were cast on glass petri dishes. The dishes were placed on dry ice or stored at −20° C. for solvent evaporation. Strong and flexible films (0.8 mm thick) were obtained. The films were stored under vacuum in a CaCl$_2$ desiccator.

The composition of CPP:SA copolymers was determined by $^1$H-NMR from the ratio of the peaks integration $\delta=1.3$ PPM (8H, sebacic acid) and $\delta=6.9-8.2$ PPM (8H, CPP). The degree of oligomerization of the prepolymers was determined from the integration of a representative peak of the repeating unit and the methyl terminals peak of the acetic mixed anhydride end group.

Polyanhydrides were synthesized by melt polycondensation, modifying to the method described by Hill and Carothers in *J. Am. Chem. Soc.*, 54, 1569 (1932) and 55, 5023 (1933) by using highly pure isolated prepolymers and optimizing the reaction conditions (temperature, time, removal of condensation product).

Aliphatic prepolymers were prepared by refluxing the dicarboxylic acid monomers (40 g) in acetic anhydride (500 ml) for 20 minutes. The excess acetic anhydride was removed to dryness under vacuum at 50° C. The crude prepolymer was recrystallized from dry toluene. The crystals were then immersed in a 1:1 mixture of dry petrol ether and ethyl ether overnight to extract traces of acetic anhydride and toluene. The pure crystals were dried under vacuum over calcium chloride (75–88% yield). Aromatic monomers were refluxed for 15 minutes, then the unreacted diacid (10–20%) was removed by filtration. The solution was concentrated to 150 ml and allowed to crystallize overnight at 0° C. The crystals were then immersed in dry ether (500 ml) overnight with stirring to extract traces of acetic anhydride. CPP prepolymer was recrystallized from a 1:10 mixture of DMF and ethyl ether as follows: prepolymer (10 g) was dissolved in warm dry DMF (30 ml). 270 ml of dry ether was then added to the solution with stirring. The solution was then allowed to crystallize at 0° C. for 3 days. The purified prepolymer was washed with dry ether (3×100 ml) and dried under vacuum over calcium chloride (42–50% yield). The prepolymers were characterized by GPC, $^1$H-NMR and IR analysis.

Melt polycondensation of the prepolymers was as in the following typical reaction: CPP prepolymer (2.0 g, 5 mmole) was mixed with sebacic acid prepolymer (1.15 g. 5 mmole) in a glass tube, 2×20 cm, (Kimax) with a side arm equipped with a capillary nitrogen inlet. The tube was immersed in an oil bath at 180° C. After the prepolymers were melted (1 minute), high vacuum ($10^{-4}$ mm Hg) was applied through the side arm. The condensation product (acetic anhydride) was collected in an acetone/dry ice trap. During the polymerization a strong nitrogen sweep with vigorous agitation of the melt was performed for 30 seconds every 15 minutes.

The crude polymer was purified by precipitation in dry petroleum ether from dichloromethane solution. The precipitate was then extracted with anhydrous ether for several hours at room temperature.

When catalysts were used, 2 molar percent catalyst was mixed with the prepolymers prior to polymerization. The insoluble heterogeneous catalysts were removed from the polymer solution by filtration.

The molecular weight average, viscosity, and melting point of polyanhydrides synthesized using the method of the present invention are shown in Table 1. The weight average molecular weight of these polymers ranged from 87,900 up to 122,800. The number average molecular weight that was obtained was in the range of 20,000 to 35,000.

Figure 1A:
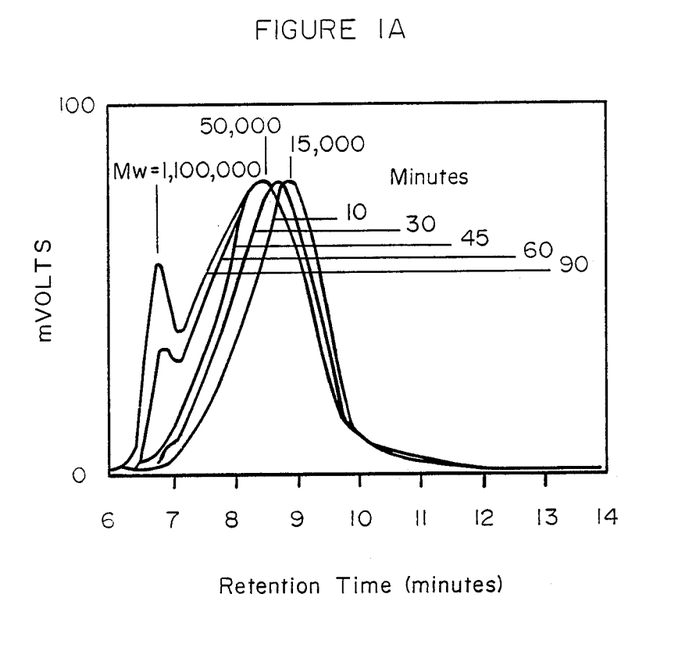
FIG. 1*a* is a determination of the molecular weight distribution of CPP:SA (20:80) polymer.
Figure 1B:
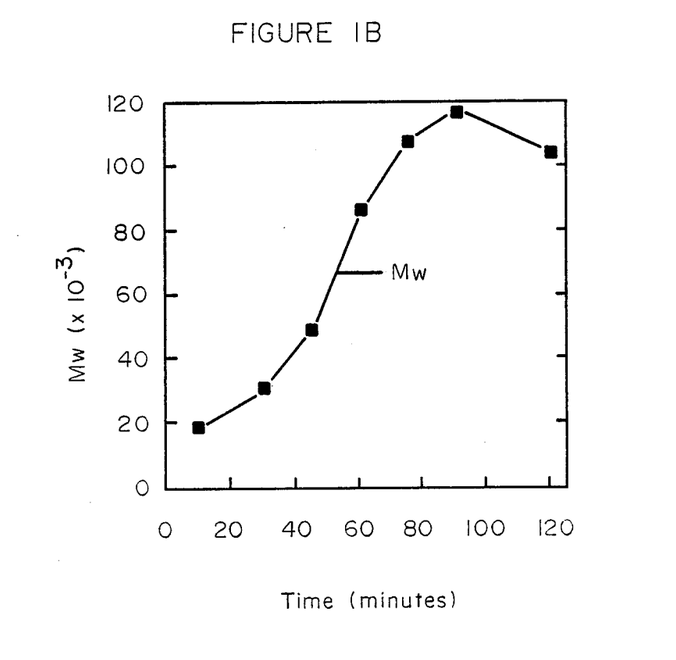
FIG. 1b is a graph of the molecular weight ($\times 10^{-3}$) of CPP:SA (20:80) as a function of time (min) of polymerization at 180° C. ($M_w$=weight average).

FIG. 1a shows the Mw distribution of CPP:SA(20:80) polymers as a function of time of polymerization using the method of the present invention. Two periods can be defined in the polymerization process, the first up to 45 minutes and the second up to 90 minutes. In the second period, the molecular weight increases without any shift of the main fraction. This can be explained by the formation of a relatively homogenic molecular weight distribution, which then couples, partially yielding a high molecular weight fraction. FIG. 1b shows the Mw of CPP:SA(20:80) as a function of time of polymerization.

Figure 2:
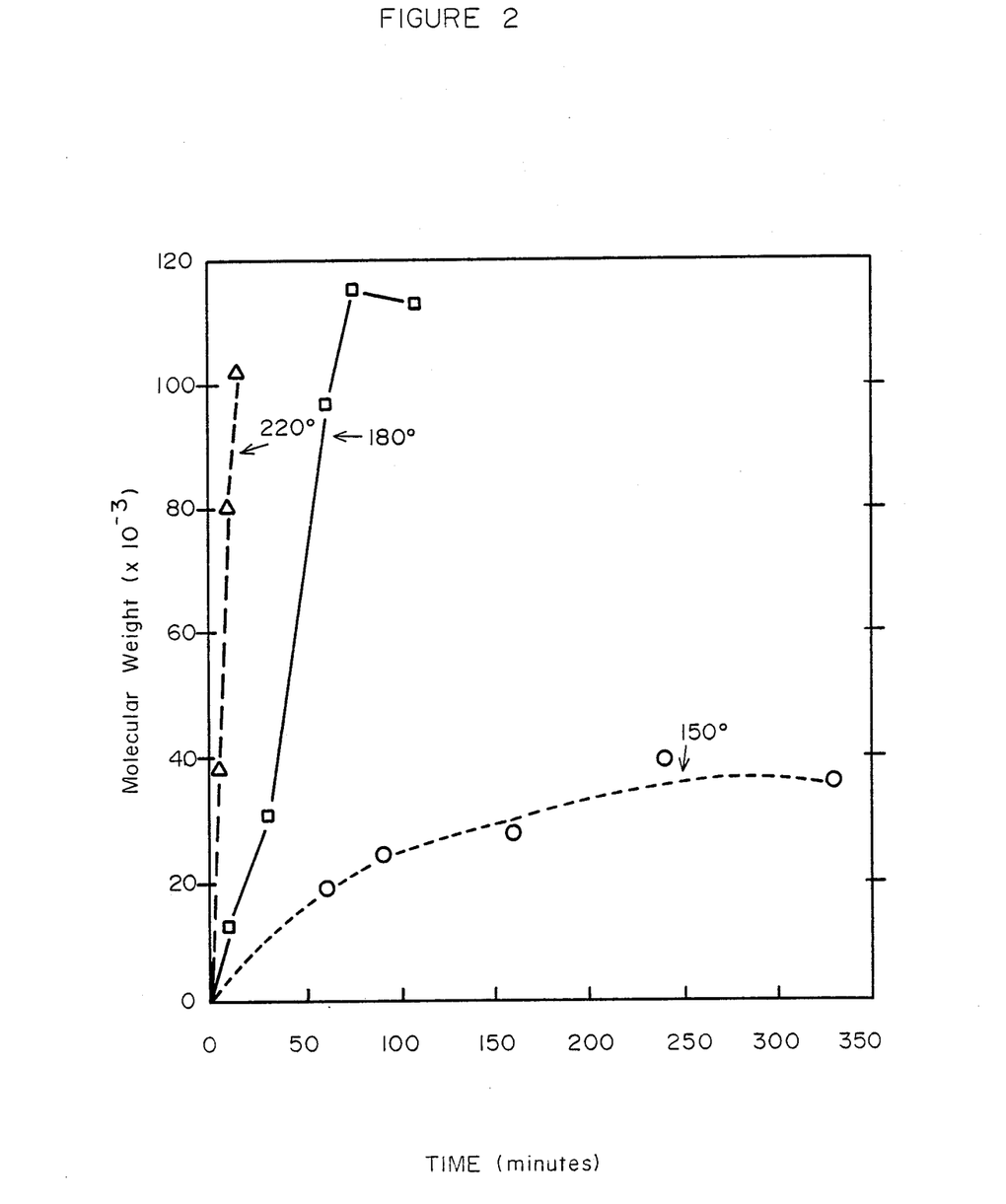
FIG. 2 is a graph of the molecular weight ($\times 10^{-3}$) of CPP:SA (20:80) as a function of temperature (150° C., 180° C., 220° C.) over time (min).

FIG. 2 is a graph of the molecular weight average of CPP:SA(20:80) at various temperatures: 150° C., 180° C. and 220° C., as a function of time of polymerization (minutes). It is clear from this graph that the time and temperature can be optimized for each polymer composition to maximize molecular weight.

TABLE 1

| Polymer | Molecular weight of polyanhydrides* | | |
|---|---|---|---|
| | Molecular Weight** Mw | Viscosity*** [n](dl/g) | Melt. Pt. C° |
| polySA | 104,800 | 0.84 | 82 |
| poly(CPP:SA) (20:80) | 116,800 | 0.92 | 72–74 |
| poly(CPP:SA)(35:65) | 87,900 | 0.86 | 126 |
| poly(IPh:SA) | 121,100 | 0.93 | 72 |
| poly(DD) | 122,800 | 1.11 | 94 |
| poly(CPP:DD)(20:80) | 120,300 | 1.05 | 75 |

*Polymerization under 180°, 90 minutes
**GPC - Calibrated with Polystyrene standards
***Chloroform, 23° C.

The molecular weight average of the high molecular weight polyanhydrides can be significantly increased by mixing a catalyst into the prepolymers and then melt polymerizing under optimum conditions. Catalysts were found to have a minor effect on the number average molecular weight. Table 2 compares the viscosity and molecular weight average for CPP:SA(20:80) polymers melt-polymerized at 180° C. using 2 mole % coordination catalysts. Significantly higher molecular weight in shorter times were achieved with $Cd(CH_3COO)_2$, earth metal oxides, calcium carbonate and $ZnEt_2$—$H_2O$. The Mw of CPP:SA(20:80) increased up to 240,133 with catalyst, in comparison to a Mw of 116,800 without catalyst, in comparison to a Mw of 116,800 without catalysts. These catalysts are preferred since the reaction type is heterogenic, resulting in easy separation of the catalyst, a requirement for use of the polymer in vivo or in other medical applications.

TABLE 2

| catalyst | Melt Polymerization of CPP-SA (20:80) Using Coordination Catalysts* | | |
|---|---|---|---|
| | polymerization time (min) | viscosity** [n](dl/g) | molecular weight*** Mw |
| no catalyst | 90 | 0.92 | 116,800 |
| barium oxide | 30 | 0.96 | 185,226 |
| cadmium acetate | 31 | 1.15 | 240,133 |
| calcium oxide | 20 | 0.88 | 140,935 |
| calcium carbonate | 28 | 0.81 | 128,763 |
| $Z_nEt_2$—$H_2O$ (1:1) | 60 | 1.18 | 199,060 |

*2 mole %
**Chloroform, 23° C.
***GPC - calibrated with polystyrene standards

Figure 3:
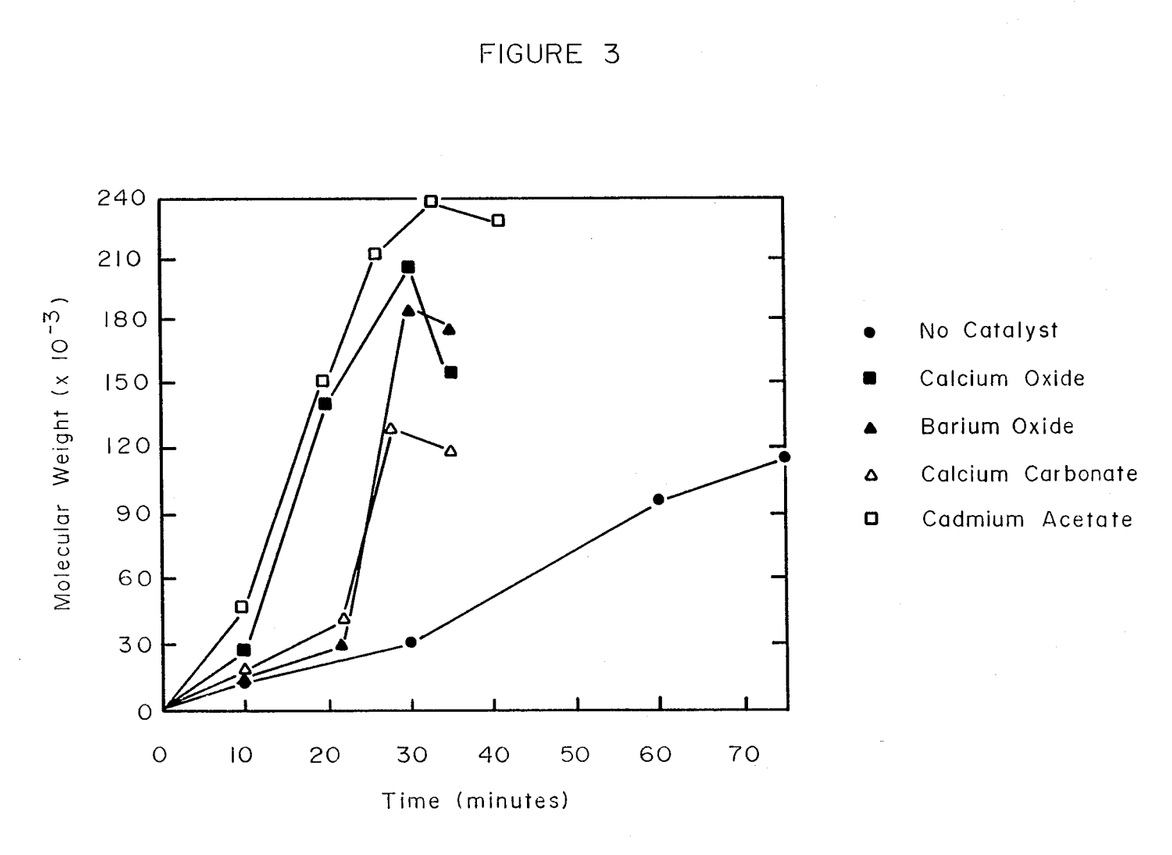
FIG. 3 is a graph of the molecular weight ($\times 10^{-3}$) of CPP:SA (20:80) polymers polymerized by melt polycondensation in the presence of no catalyst or 2 mole % catalyst: calcium oxide, barium oxide, calcium carbonate and cadmium acetate, as a function of time of polymerization (min).

The molecular weights of CPP:SA(20:80) polymerized with 2 mole % catalyst are depicted in FIG. 3 as a function of time of polymerization (min). Calcium oxide, barium oxide, calcium carbonate, and cadmium acetate were used as the catalysts. The Mw and polymerization time for the polymerization of polyanhydride at 180° C. with the catalyst cadmium acetate (2 mole% cadmium acetate: 10 m mole prepolymer) are listed in Table 3.

TABLE 3

| Polymerization of polyanhydrides using cadmium acetate as catalyst | | |
|---|---|---|
| polymer | polymerization time (min) | Mw |
| P(IPh:SA)(20:80) | 40 | 178,100 |
| P(IPh:SA)(50:50) | 35 | 87,850 |
| P(CPP:DD)(20:80) | 35 | 184,900 |
| P(CPP:DD)(50:50) | 40 | 61,050 |
| DD | 60 | 134,200 |
| SAK | 60 | 138,500 |

These results demonstrate that high molecular weight polyanhydrides can be synthesized from pure isolated prepolymers by melt-condensation under optimum conditions. In the examples, these conditions were within a narrow range, between 150° C. and 220° C., preferably 180° C., for a time of from 60 to 120 minutes, preferably 90 min. The molecular weight of these polymers can be significantly increased by including a catalyst, preferably a coordination catalyst such as Cd Acetate, an earth metal oxide, calcium carbonate or complex of $Z_nEt_2$-hydroxylated compound. The polymers formed using these methods including polymers formed from sebacic acid, dodecaredioic acid, bis(p-carboxyphenoxy)propane, isophthalic acid, and combinations thereof, having molecular weights up to 240,133 and intrinsic viscosity of up to 1.18 dl/g.

Figure 4:
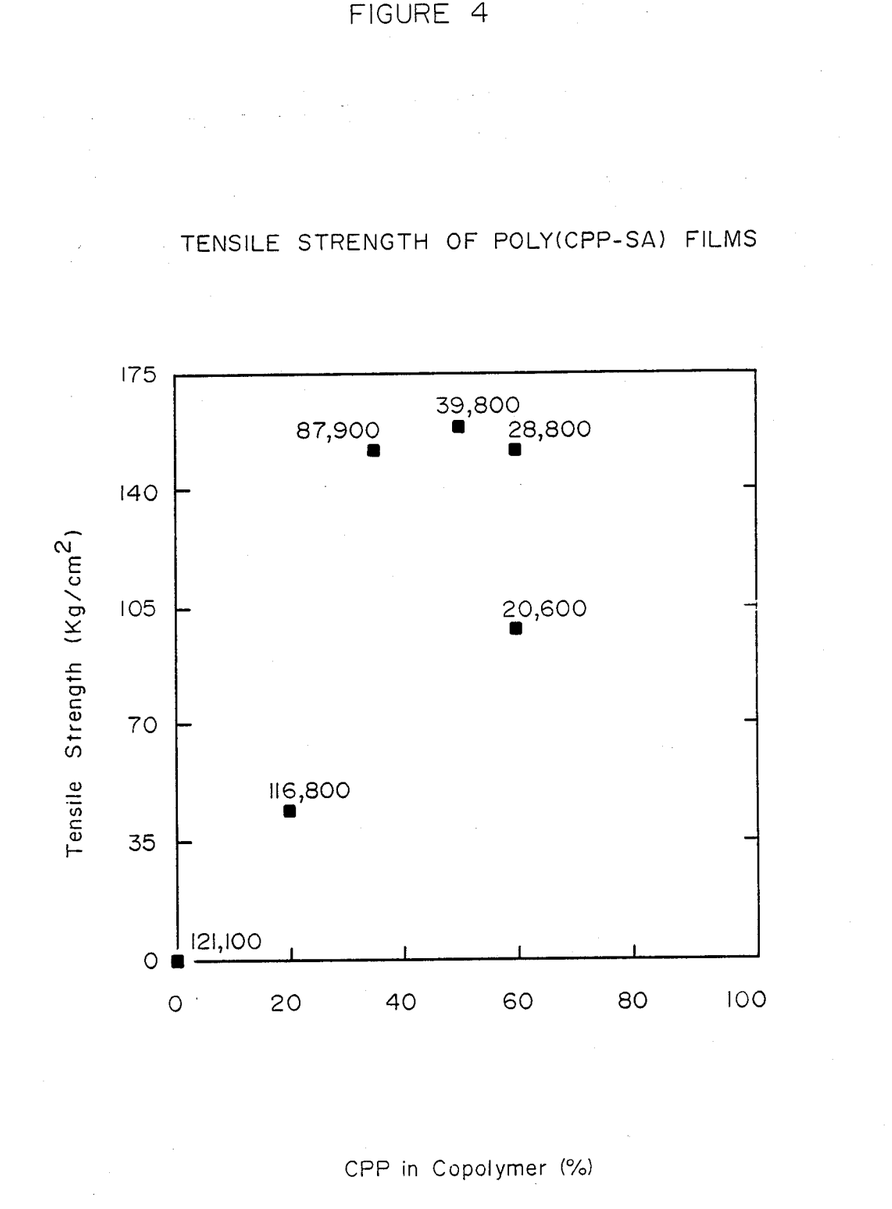
FIG. 4 is a graph of the tensile strength (kg/cm$^2$) of poly(CPP:SA) films as a function of the percent CPP and molecular weight.

The high molecular weight polyanhydrides have improved physico-mechanical properties as shown in FIG. 4. FIG. 4 is a graph of the tensile strength of films made of CPP copolymers as a function of percent CPP and as a function of molecular weight increasing either the percent CPP or the molecular weight increases tensile strength.

These polymers have many useful applications, particularly in the biomedical area. For example, they may be used to form a bioerodible matrix for controlled release of a bioactive compound such as nutrients, drugs, and compounds having agricultural applications. They are also useful in the manufacture of sutures, protective coverings, for example, to replace skin on burn patients; to secure wounds; as patches following surgery; and as absorbable bone replacements.

The following examples demonstrate the use of HMW PA synthesized according to the method of the present invention.

EXAMPLE 1

Figure 5:
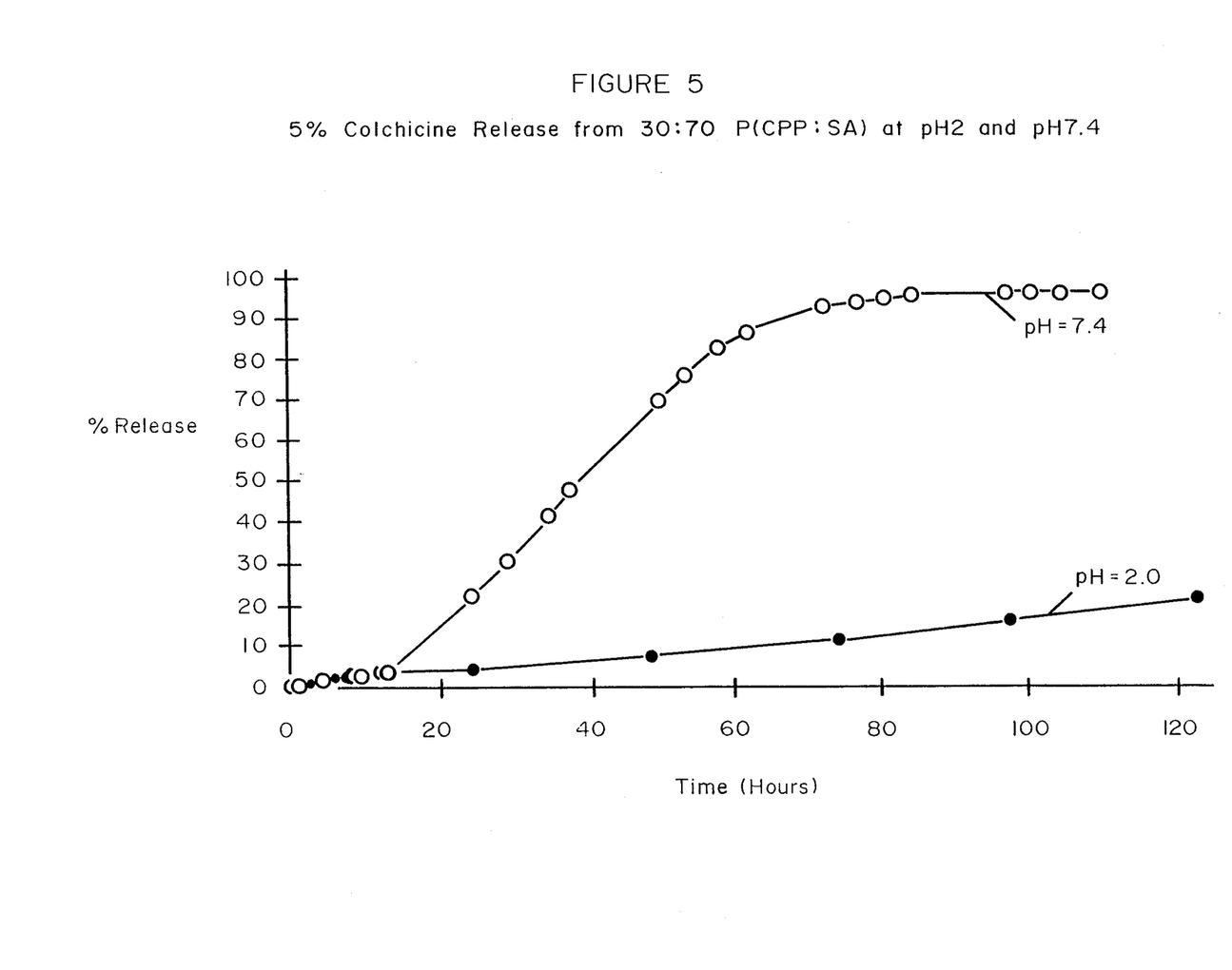
FIG. 5 is a graph of the percent colchicine released in vitro from one mm polyCPP:SA(30:70) film at pH 7.4 and pH 2.0 over time (hr).

In vitro release of colchicine from a polyCPP:SA(30:70) film of 5% colchicine loading The in vitro release rate for a representative drug, colchicine (400 mw), from a polyCPP:SA(30:70) film is shown in FIG. 5 as the percent release over time (hr) at 37° C. in buffered solutions having a pH of 2.0 and 7.4. The one mm thick film was formed by solvent casting the 5% colchicine—polyCPP:SA(30:70) solution mixture.

The results demonstrate that a controlled release occurs over a period of at least six days at pH 7.4 due to surface erosion of the polymer. Since the polymer is relatively stable at pH 2.0, there is no leaching of the colchicine out of the film due to other factors.

EXAMPLE 2

In vivo release of insulin from 300 micron polyCPP:SA(20:80) microcapsules

Figure 6:
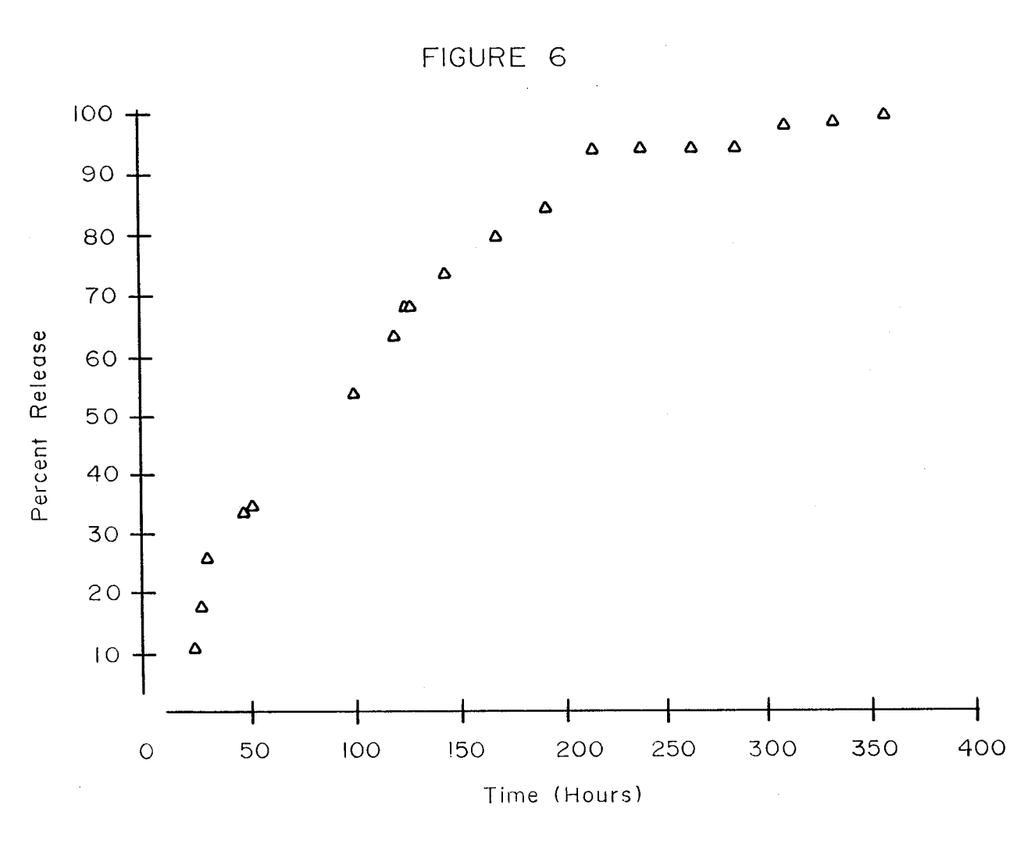
FIG. 6 is a graph of the percent insulin released in vitro over time (hr) from 300 micron polyCPP:SA(20:80) microspheres in pH 7.4 buffer at 37° C.

The in vivo release rate of insulin, a polypeptide hormone of approximately 6000 molecular weight, from 300 micron polyCPP:SA(20:80) microspheres is shown in FIG. 6. The percent release of insulin into 0.1M phosphate buffer pH 7.4 at 37° C. clearly establishes that zero order release is occurring over a period of approximately two weeks.

The polyCPP:SA(20:80) has a molecular weight average of 92,000.

EXAMPLE 3

Figure 7A:
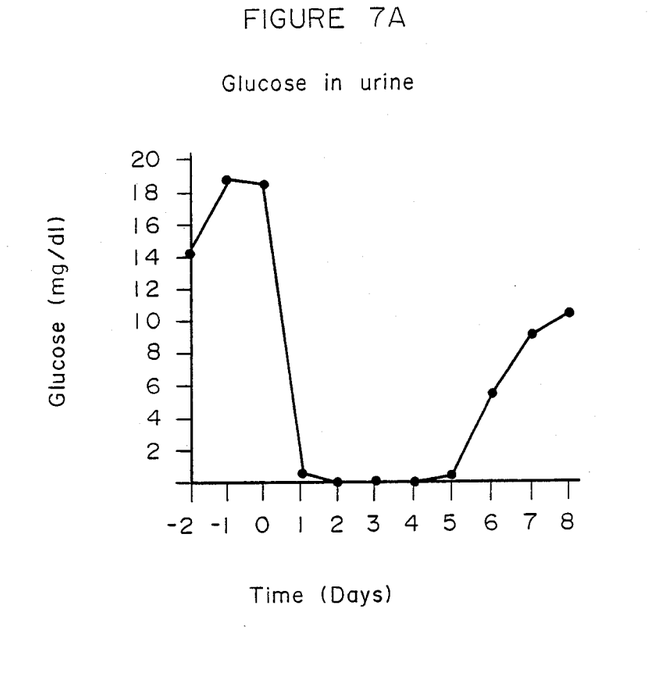
FIG. 7a is a graph of glucose (mg/dl) in urine over time (days) demonstrating the effect of in vivo release of insulin in rats from 300 micron microspheres formed of polyCPP:SA(20:80) of 5% insulin loading.
Figure 7B:
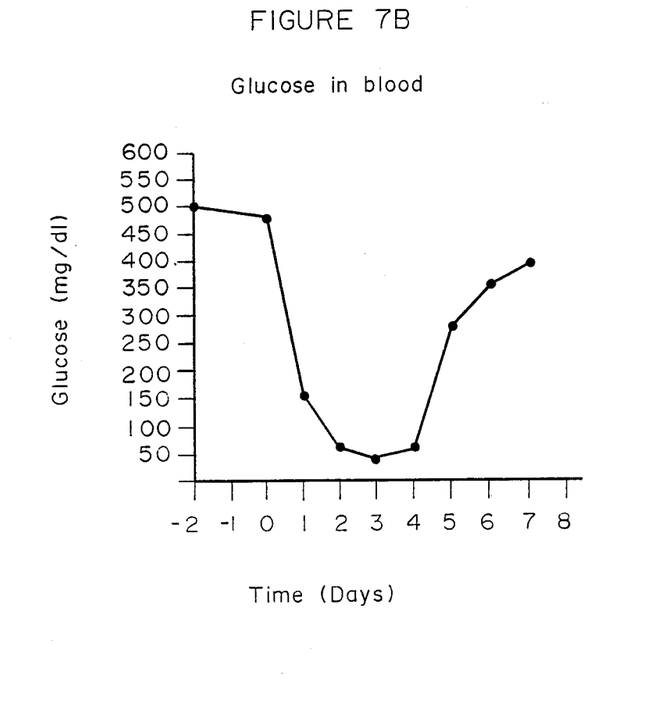
FIG. 7b is a graph of glucose (mg/dl) in blood over time (days) demonstrating the effect of in vivo release in rats of insulin for 300 micron microspheres formed of polyCPP:SA(20:80) of 5% insulin loading.

In vivo release of insulin in rats from 300 micron polyCPP:SA(20:80) microcapsules The effectiveness of insulin release in vivo in rats (average 200 g) from 300 micron polyCPP:SA(20:80) microspheres of 5% insulin loading demonstrated in FIG. 7a and 7b. FIG. 7a is a graph of glucose (mg/dl) in urine over eight days. FIG. 7b is a graph of glucose (mg/dl) in blood over eight days. The insulin is released over a period of several days, with an effectiveness of four to five days at this loading in microspheres of this size and composition. The microspheres totally disappear after seven days.

The polyCPP:Sa(20:80) polymers forming injectible microspheres of 300 microns have a molecular weight of 92,000. PolyCPP:SA(20:80) polymers formed using the prior art methods have a molecular weight of 12,000. Although not directly comparable, larger non-injectible size microspheres formed of the low molecular weight polyCPP:SA(20:80) of approximately 800 microns in diameter, of 5% insulin loading are required to obtain an effective release over a period of three days.

EXAMPLE 4

In vivo release of insulin in rats from a 0.5 mm thick polyCPP:SA(20:80) film

Figure 8:
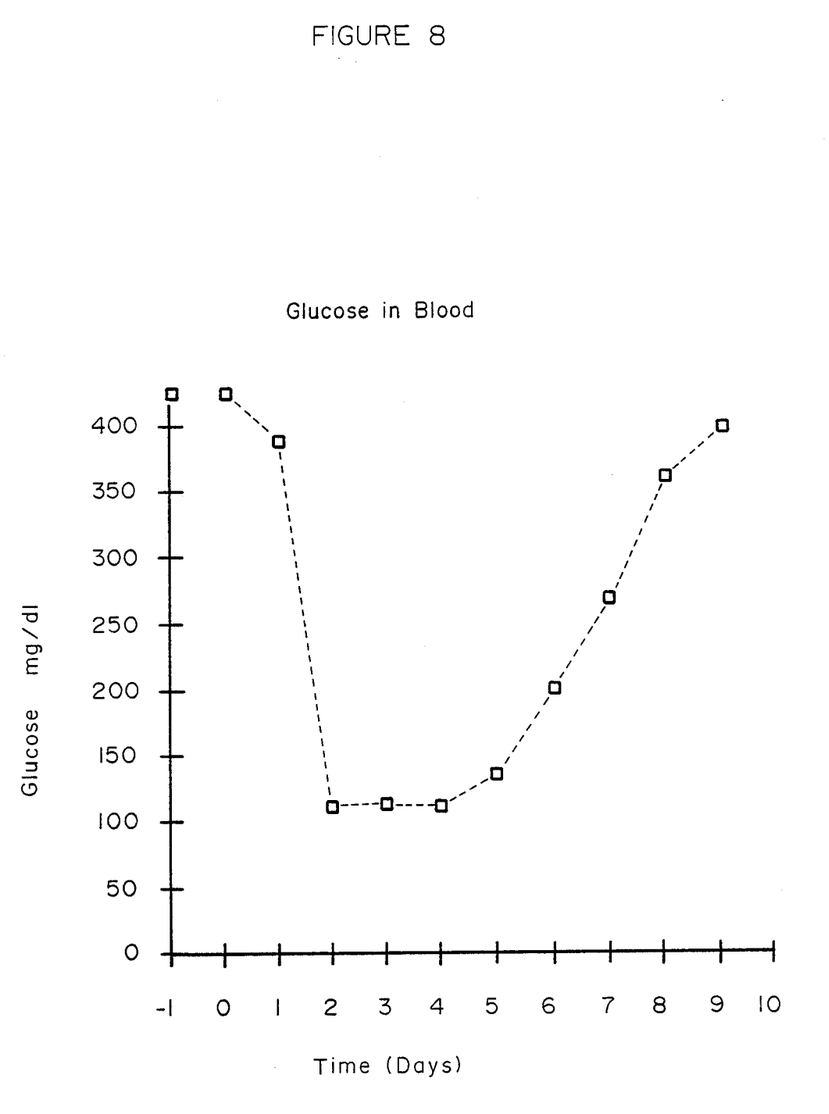
FIG. 8 is a graph of glucose (mg/dl) in blood over time (days) demonstrating the effect of in vivo insulin release in rats from a 0.5 mm polyCPP:SA(20:80) film of 5% insulin loading.

FIG. 8 shows the effectiveness of in vivo insulin release in rats over a period of several days from a polyCPP:SA(20–80) film of 5% insulin loading. The 0.5 mm thick film is prepared by suspending the insulin in the polymer dissolved in chloroform and casting. After removal of the solvent, the 200 mg film is surgically implanted under the skin of the rats (200 g average).

Release of the insulin from the films is effective in controlling blood glucose levels for approximately five days, slightly longer than release from the 300 micron microspheres of 5% insulin loading of example 3. However, films have an even more important advantage over the injectable microspheres in that they may be surgically removed if there is a problem with the drug being released. Due to their particular nature and scattering, removal of microspheres is extremely difficult.

This invention has been described with reference to its preferred embodiments. Variations and modifications of the method and high molecular weight polyanhydrides produced thereby will be ovbious to those skilled in the art. It is intended that all of these variations and modifications be included within the scope of the appended claims.

We claim:

1. A high molecular weight polyanhydride having a weight average molecular weight of greater than 20,000 and an intrinsic viscosity of greater than 0.3 dl/g in chloroform at 23° C., said polyanhydride produced from at least one dicarboxylic acid selected from the group consisting of:

aliphatic dicarboxylic acids having the formula:

aromatic dicarboxylic acids having the formula:

aromatic dicarboxylic acids having the formula:

aliphatic-aromatic dicarboxylic acids having the formula:

aromatic and aliphatic heterocyclic dicarboxylic acids having the formula:

wherein X is selected from the group consisting of oxygen, nitrogen, and sulfur, and n is an integer between 1 and 3; and aromatic and aliphatic heterocyclic dicarboxylic acids of the above formula in combination with at least one dicarboxylic acid selected from the group consisting of aliphatic dicarboxylic acids, aromatic-aliphatic dicarboxylic acids, and aromatic dicarboxylic acids having more than one phenyl group;

wherein the R groups are divalent organic radical groups.

2. A high molecular weight polyanhydride synthesized by:

polymerizing at least one highly pure prepolymer produced from a mixture of anhydrides prepared from at least one highly pure dicarboxylic acid at a temperature and for a reaction time to form a polyanhydride having a weight average molecular weight in excess of 20,000;

removing the polyanhydride condensation product having a weight average molecular weight in excess of 20,000 formed by said polymerization; and stopping said polymerization before said polyanhydride condensation product decreases in molecular weight.

3. The high molecular weight polyanhydride of claim 2 wherein at least one dicarboxylic acid is selected from the group consisting of sebacic acid, 4,4'-[α,w-alkanediylbis(oxy)]bis[benzoic acid], isophthalic acid, dodecanedioic acid, 2,2'-[1,4-phenylenebis(oxy)]bisacetic acid, 1,4-bis(carboxymethyl)benzene, 2,2'-[(1-methylethylidene)bis(4,1-phenyleneoxy)]bisacetic acid, 2,2-bis(4-carboxyphenyl)propane; terephthalic acid; 1,4 phenylene dipropionic acid; 4,4'-(n-alkylidene)bis[benzoic acid]; and cyclohexane dicarboxylic acids.

4. The high molecular weight polyanhydride of claim 2 synthesized by polymerizing at least one highly pure prepolymer with a catalyst.

5. The high molecular weight polyanhydride of claim 4 wherein said catalyst is selected from the group of catalysts consisting of acid, base and coordination catalysts.

6. The high molecular weight polyanhydride of claim 5 wherein the catalyst is selected from the group consisting of $(CH_3COO)_2Cd$, alkaline earth metal oxides, calcium carbonate and complexes of diethylzinc and hydroxylated compounds.

7. A composition comprising a high molecular weight polyanhydride synthesized by:
   polymerizing at least one highly pure prepolymer produced from a mixture of anhydrides prepared from at least one highly pure dicarboxylic acid at a temperature and for a reaction time to form a polymer having a weight average molecular weight in excess of 20,000;
   removing the polyanhydride condensation product having a weight average molecular weight in excess of 20,000 formed by said polymerization; and
   stopping said polymerization before said polyanhydride condensation product decreases in molecular weight.

8. A composition comprising a high molecular weight polyanhydride having a weight average molecular weight of greater than 20,000 and an intrinsic viscosity of greater than 0.3 dl/g in chloroform at 23° C., said polyanhydride produced from at least one dicarboxylic acid selected from the group consisting of:
   aliphatic dicarboxylic acids having the formula:

$HOOC—H_2C—R—CH_2—COOH$;

aromatic dicarboxylic acids having the formula:

aromatic dicarboxylic acids having the formula:

aliphatic aromatic dicarboxylic acids having the formula:

aromatic and aliphatic heterocyclic dicarboxylic acids having the formula:

wherein X is selected from the group consisting of oxygen, nitrogen, and sulfur, and
   n is an integer between 1 and 3; and
   aromatic and aliphatic heterocyclic dicarboxylic acids of the above formula in combination with at least one dicarboxylic acid selected from the group consisting of aliphatic dicarboxylic acids, aromatic-aliphatic dicarboxylic acids, and aromatic dicarboxylic acids having more than one phenyl group,
   wherein R groups are divalent organic radical groups.

9. A high molecular weight polyanhydride having a weight average molecular weight of greater than 20,000 and an intrinsic viscosity of greater than 0.3 dl/g in chloroform at 23° C., wherein said polyanhydride is produced from at least one dicarboxylic acid selected from the group consisting of sebacic acid, 4,4'-[α,w-alkanediylbis(oxy)]bis[benzoic acid], isophthalic acid, dodecanedioic acid, 2,2'-[1,4-phenylenebis(oxy)]bisacetic acid, 1,4-bis(carboxymethyl)benzene, 2,2'-[(1-methylethylidene)bis(4,1-phenyleneoxy)]bisacetic acid, 2,2-bis(4-carboxyphenyl)propane; terephthalic acid; 1,4 phenylene dipropionic acid; 4,4'-(n-alkylidene)bis[benzoic acid]; and cyclohexane dicarboxylic acids.

10. A method for synthesizing a high molecular weight polyanhydride comprising:
    polymerizing at least one highly pure prepolymer prepared from at least one highly pure dicarboxylic acid at a temperature and for a reaction time to form a polyanhydride having a weight average molecular weight in excess of 20,000;
    removing the polyanhydride condensation product having a weight average molecular weight in excess of 20,000 formed by said polymerization; and
    stopping said polymerization before said polyanhydride condensation product decreases in molecular weight.

11. The method of claim 10 wherein the polymer is polymerized in the presence of a catalyst.

12. The method of claim 11 wherein the catalyst is selected from the group consisting of acid, base, and coordination catalysts.

13. The method of claim 12 wherein said catalyst is selected from the group consisting of $(CH_3COO)_2Cd$, alkaline earth metal oxides, calcium carbonate, and complexes of diethylzinc and hydroxylated compounds.

14. The method of claim 10 further comprising forming at least one prepolymer from at least one highly pure dicarboxylic acid by refluxing said dicarboxylic acid in an aliphatic anhydride.

15. The method of claim 10 further comprising forming at least one prepolymer from at least one highly pure dicarboxylic acid by reacting said dicarboxylic acid with an aliphatic acid chloride in the presence of an organic base.

16. The method of claim 10 wherein said temperature is between 140° C. and 250° C. and said reaction time is between 10 minutes and 300 minutes.

17. The method of claim 10 wherein said polymerization is stopped before said polyanhydride forms an insoluble gel.

18. The method of claim 10 wherein said temperature is approximately 180° C. and said reaction time is approximately 90 minutes.

19. The method of claim 10 further comprising selecting at least one dicarboxylic acid from the group consisting of:

aliphatic dicarboxylic acids having the formula:

HOOC—H$_2$C—R—CH$_2$—COOH;

aromatic dicarboxylic acids having the formula:

aromatic dicarboxylic acids having the formula:

aliphatic-aromatic dicarboxylic acids having the formula:

aromatic and aliphatic heterocyclic dicarboxylic acids having the formula:

wherein X is selected from the group consisting of oxygen, nitrogen, and sulfur, and n is an integer between 1 and 3; and aromatic and aliphatic heterocyclic dicarboxylic acids of the above formula in combination with at least one dicarboxylic acid selected from the group consisting of aliphatic dicarboxylic acids, aromatic-aliphatic dicarboxylic acids, and aromatic dicarboxylic acids having more than one phenyl group, wherein the R groups are divalent organic radical groups.

20. The method of claim 19 wherein at least one dicarboxylic acid is selected from the group consisting of: sebacic acid, 4,4'-[α,w-alkanediylbis(oxy)]bis[benzoic acid], isophthalic acid, dodecanedioic acid, 2,2'-[1,4-phenylenebis(oxy)]bisacetic acid, 1,4-bis(carboxymethyl)benzene, 2,2'-[(1-methylethylidene)-bis(4,1-phenyleneoxy)]bisacetic acid, 2,2-bis(4-carboxyphenyl)propane; terephthalic acid; 1,4 phenylene dipropionic acid; 4,4'-(n-alkylidene)bis[benzoic acid]; and cyclohexane dicarboxylic acids.

* * * * *